(No Model.)
J. CLAYTON.
PLOW ATTACHMENT.
No. 304,616.  Patented Sept. 2, 1884.
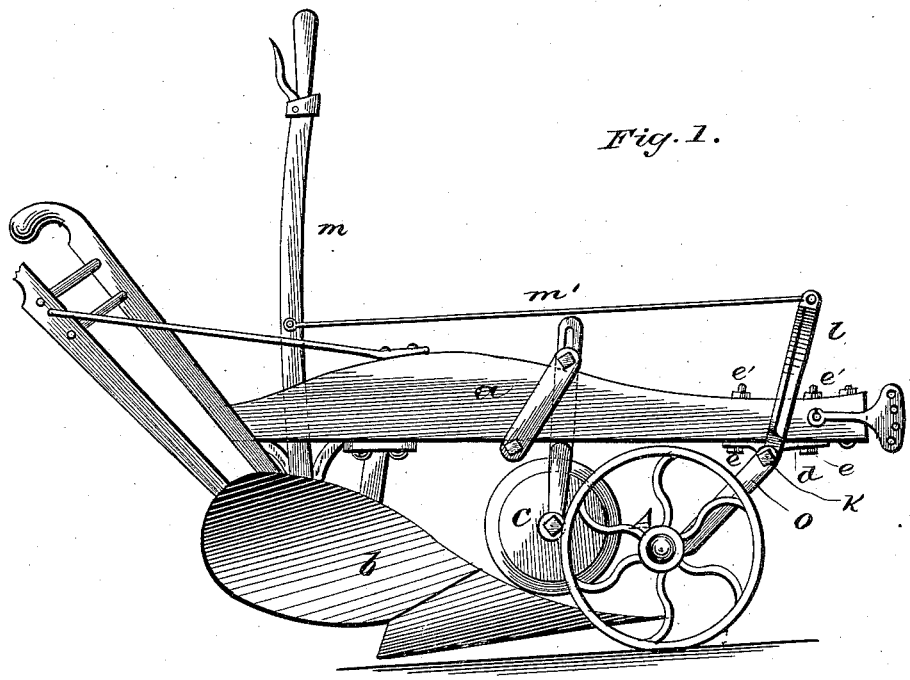
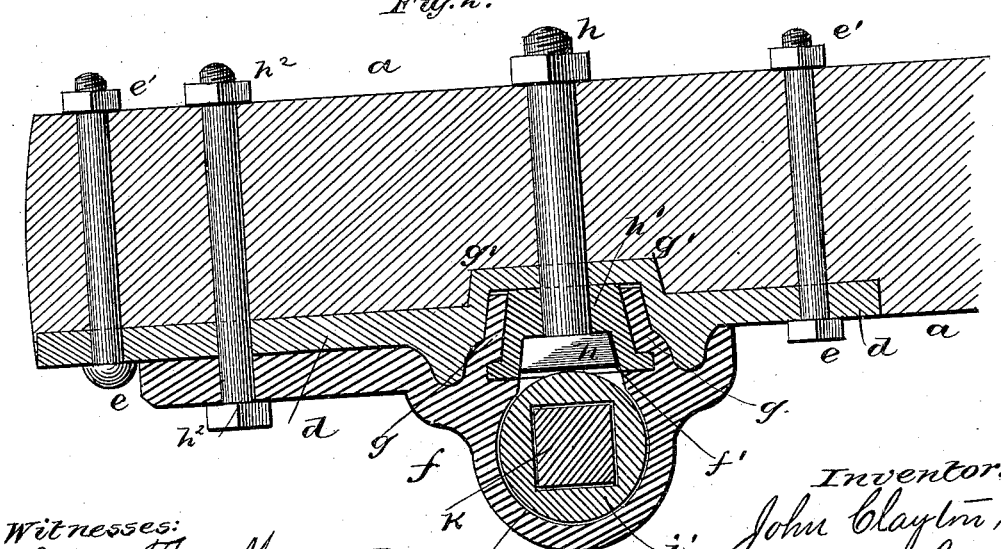
Witnesses:
John T. Morrow
Villette Anderson
Inventor:
John Clayton,
by Anderson Smith
his Attorneys.

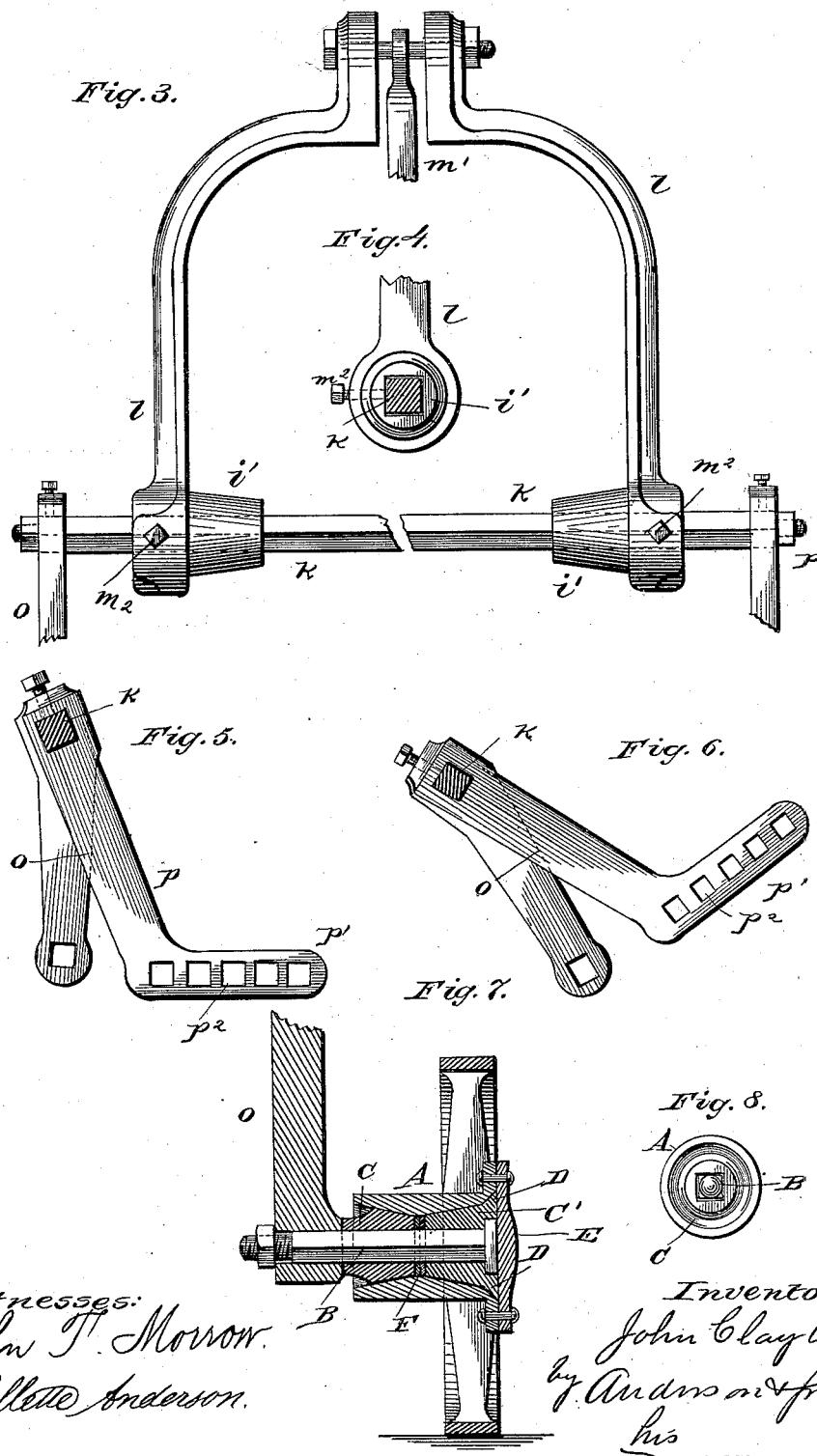

UNITED STATES PATENT OFFICE.

JOHN CLAYTON, OF WADENA, MINNESOTA.

PLOW ATTACHMENT.

SPECIFICATION forming part of Letters Patent No. 304,616, dated September 2, 1884.

Application filed August 15, 1883. Renewed May 15, 1884. (No model.)

*To all whom it may concern:*

Be it known that I, JOHN CLAYTON, a citizen of the United States, residing at Wadena, in the county of Wadena and State of Minnesota, have invented certain new and useful Improvements in Plow Attachments; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a side elevation of a plow having my improved attachments. Fig. 2 is a vertical sectional view of the plow-beam, head-block, and bolster-plate. Fig. 3 is an elevation of the sectional yoke secured to the axle. Figs. 4, 5, and 6 are detail views. Fig. 7 is a sectional view of one of the wheels, its hub, conical sleeves, and the axle-journal; and Fig. 8 is a cross-section of the hub.

This invention has relation to plow attachments for wheel-plows, and is designed to render any plow on which it is placed a perfect self-holder; also, to enable the operator to adjust the plow at will to the various depths that may be required as the plow travels; also, to lift the plow out of the ground at the ends of the furrows for ease in turning; and it consists in the construction and novel arrangement of devices, as will be hereinafter fully described, and particularly pointed out in the claims appended.

Referring by letter to the accompanying drawings, $a$ designates the plow-beam, $b$ the plow, and $c$ the colter.

$d$ designates the bolster-plate, attached to the under face of the plow-beam, near its front end, by the bolts $e\ e$ and nuts $e'\ e'$.

$f$ designates the head-block attached to the bolster-plate $d$, having concentric rings $g$ formed to fit into the rings $g'$ in the bolster-plate, in which it revolves when the plow is used with a pole, and also when the shaft which passes through the head-block is set square to the landside of the plow. The head-block $f$ is provided with a recess, $f'$, in its under side, through which passes the king-bolt $h$, having a flanged conical washer, $h'$, surrounding it.

The end of the conical washer or sleeve is a little longer than the thickness of the head-block, which is secured to the bolster-plate by the nut-bolt $h^2$, allowing the head-block to revolve or pivot on the conical flanged washer surrounding the lower end of the king-bolt. The head-block $f$ is also provided with conical holes $i$, or bearings, in which are fitted conical sleeves $i'$, having a square or round hole in them, through which a square or round shaft, $k$, passes. These conical sleeves $i'$ are secured to and adjusted upon the square or round shaft by set-screws on the ends of the sleeves projecting beyond the bearing of the head-block. The yoke $l$, by means of which the square or round shaft $k$ is made to partially revolve by the action of the lever $m$, connected thereto by the rod $m'$, is also provided with square or round holes for the square or round shaft to pass through. Set-screws $m^2$ are employed to secure the yoke to the shaft, to render it firm and positive in its action. The ends of the square or round shaft $k$ are provided with wheel-arms $o$ and $p$, secured thereon by set-screws. The furrow-wheel arm has a hole at its lower end, through which the axle of the furrow-wheel passes, and is secured by a set-screw. The arm $p$, or the arm for the landside-wheel, is provided at its lower end with an extension, $p'$, with a series of holes, $p^2$, or a long slot in it, which extension assumes a vertical position when the plow is in the ground, and a horizontal position when the plow is lifted out of the ground, so that, in whatever hole $p'$ or position the axle of the landside-wheel is secured, the plow will stand level when out of the ground. This extension, being provided with the series of square holes $p'$ or long slot, enables the operator to so attach the landside-wheel to the extension as to regulate the depth he may desire to plow from two and one-half to seven and one-half inches, or any other gage that may be constructed in the extension. If, while set at any of these depths, it may be found necessary to vary the depth, it can be done by the action of the lever, which will move the yoke, and thus change the depth. The lever engages a rack on the side of the beam, and is pivoted to the quadrant and one of the handles. The wheel-axle is fitted with a sleeve and washer, with a square bolt having a dovetailed head, to prevent it from being drawn through the sleeve when secured to the arm by the nut.

A designates the hub of the wheel; B, the square bolt or axle; C and C', the conical sleeves placed in the hub from opposite ends of the same; D, the flange on the outer end of the hub, and E the cap secured thereto by rivet-bolts. The sleeves C C' are separated by internal washers, F, two or more in number, which may be removed when the sleeves wear away to compensate for wear. The wheel has an annular projection over the inner sleeve to keep the dust out.

The conical sleeves $i'$ and yoke $l$ may be made in one piece, or they may be made separate. It is preferred to make them in one piece, as when they are made separate they are apt to be broken by undue pressure of the set-screw on the shaft. A space is left between the upper ends of the arms of the yoke $l$, in order that they may be moved nearer together to compensate for the wear that takes place on the sleeves and in the bearings of the head-blocks. The set-screws that secure the half-yokes to the square or round shaft are on the rear side, and the yoke is made extra thick at these points.

Having thus fully described my invention, what I claim as new, and desire to secure by Letters Patent, is—

1. In a wheel attachment for plows, the combination, with the bolster-plate $d$, provided in its under face with the concentric rings $g'$ and the recess $f'$, and secured to the beam by bolts $e\ e$, of the king-bolt $h$, conical flanged sleeve $h'$, the head-block $f$, having concentric rings $g$, and bearings $i$, having the conical sleeves $i'$, provided with rectangular holes for the shaft $k$, and the securing-bolt $h^2$, substantially as specified.

2. The combination, with the bolster-plate, head-block having the bearings for the shaft $k$, and the king-bolt and conical flanged washer or sleeve, of the yoke $l$, secured to the shaft $k$, and connected by a rod, $m'$, to the lever $m$, and the wheel-arms $o$ and $p$, the latter being provided with the extension $p'$, having the series of rectangular holes $p^2$, and the furrow and landside wheels, substantially as specified.

In testimony whereof I affix my signature in presence of two witnesses.

JOHN CLAYTON.

Witnesses:
A. MURRAY,
GILES PEAKE.